(12) United States Patent
Asami

(10) Patent No.: US 7,746,572 B2
(45) Date of Patent: Jun. 29, 2010

(54) IMAGING LENS AND IMAGE PICKUP APPARATUS

(75) Inventor: Taro Asami, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 122 days.

(21) Appl. No.: 12/195,029

(22) Filed: Aug. 20, 2008

(65) Prior Publication Data

US 2009/0052061 A1 Feb. 26, 2009

(30) Foreign Application Priority Data

Aug. 21, 2007 (JP) .......................... P2007-214271

(51) Int. Cl.
*G02B 9/34* (2006.01)
(52) U.S. Cl. ...................... 359/783; 359/781
(58) Field of Classification Search ............... 359/748, 359/753, 771, 781, 783
See application file for complete search history.

(56) References Cited

U.S. PATENT DOCUMENTS

| | | | |
|---|---|---|---|
| 6,956,703 B2 | 10/2005 | Saito et al. | |
| 7,636,205 B2 * | 12/2009 | Yamamoto | 359/781 |
| 7,639,432 B2 * | 12/2009 | Asami | 359/770 |
| 2004/0240081 A1 | 12/2004 | Saito et al. | |

FOREIGN PATENT DOCUMENTS

| | | |
|---|---|---|
| JP | 1-265216 A | 10/1989 |
| JP | 2004-61763 A | 2/2004 |
| JP | 2004-145256 A | 5/2004 |
| JP | 2004-354888 A | 12/2004 |
| JP | 3723637 B2 | 9/2005 |

* cited by examiner

*Primary Examiner*—David N Spector
(74) *Attorney, Agent, or Firm*—Birch, Stewart, Kolasch & Birch, LLP

(57) ABSTRACT

An imaging lens comprises, in order from an object side: a first lens that has a negative refractive power and is convex toward the object side; a second lens that has a positive refractive power and is a meniscus lens convex toward the object side; a stop; a third lens that has a positive refractive power and is convex toward an image side; and a cemented lens that has a positive refractive power as a whole and is formed by cementing a fourth lens and a fifth lens, wherein assuming that an Abbe number of the second lens with respect to d-line is $\nu_2$, a distance on an optical axis from a vertex of a surface of the first lens facing toward the object side to an image plane of the imaging lens is L, a focal length of the imaging lens is f, and a back focus of the imaging lens is Bf, the following conditional expressions (1) to (3) are satisfied:

$\nu_2 > 30$ (1), $2.5 < L/f < 4.0$ (2), and $0.5 < Bf/f < 1.3$ (3).

18 Claims, 8 Drawing Sheets

EXAMPLE 1

EXAMPLE 1

EXAMPLE 2

EXAMPLE 3

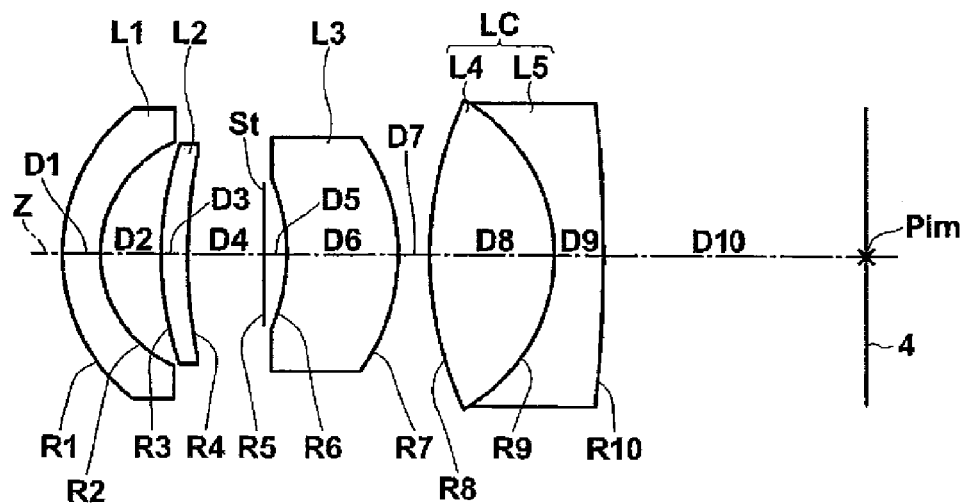
FIG. 5 EXAMPLE 4
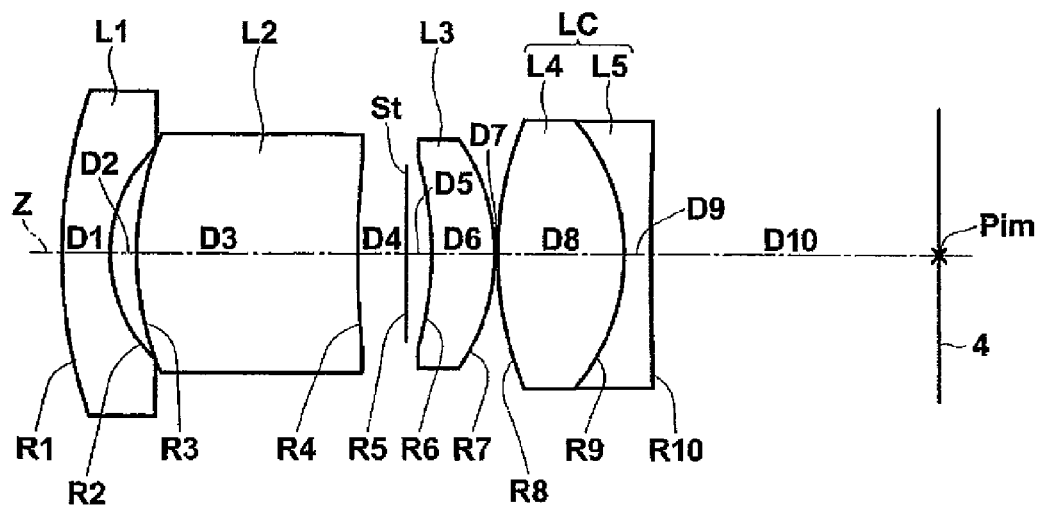
FIG. 6 EXAMPLE 5

EXAMPLE 6

EXAMPLE 7

IMAGING LENS AND IMAGE PICKUP APPARATUS

BACKGROUND OF THE INVENTION

1. Field of the Invention

The present invention relates to an imaging lens and an image pickup apparatus, more particularly, to an imaging lens suitable to be used in a surveillance camera, a cell phone camera, an on-board camera, and the like employing an image pickup device such as a CCD (Charge Coupled Device) and a CMOS (Complementary Metal Oxide Semiconductor), and an image pickup apparatus having the imaging lens.

2. Description of the Related Art

Recently, image pickup devices such as CCD and CMOS which have been excessively downsized and of which the number of pixels has been excessively increased. In addition, an image pickup apparatus main body having the image pickup device has been also downsized, and thus it is also required to unweight and downsize an imaging lens mounted therein.

Meanwhile, in an on-board camera, a surveillance camera, and the like, there is required a small-sized and high-performance lens that has high antiweatherability in the range from outside air in a cold region to a vehicle inside in summer of a tropical region and can be used in the wide temperature range. In addition, in case of the on-board camera, it is also required that a part of lens exposed to the outside of a vehicle should be small.

In JP-A-2004-354888 (corresponding to U.S. Pat. No. 6,956,703B2) and JP-A-2004-61763, there is described an endoscope lens as a small sized imaging lens including, in order from an object side, a negative first lens, a positive second lens, an aperture diaphragm, a positive third lens, and a cemented lens. In addition, in Japanese Patent No. 3723637, there is described a lens for a still camera including, in order from, a negative first lens, a positive second lens convex toward an image side, an aperture diaphragm, a positive third lens, and a cemented lens.

However, since the lens described in JP-A-2004-354888 and JP-A-2004-61763 is an imaging lens for an endoscope, an F number thereof is large and the lens is formed as a dark optical system. Thus, the lens is inappropriate for a surveillance camera or an on-board camera to take a video. In addition, in a camera that is disposed in a vehicle to monitor the front side of the vehicle, there is required a bright lens that has a small F number to be able to be used even at nighttime. The lens described in Japanese Patent No. 3723637 has a long length of the whole optical system in an optical axis direction, and is not configured to be able to sufficiently correspond to the requirement of recent downsizing.

SUMMARY OF THE INVENTION

In consideration of the situation mentioned above, it is an object of the invention to provide an imaging lens that has a small F number and a small size while maintaining a good optical performance, and an image pickup apparatus having the imaging lens.

According to an aspect of the invention, the imaging lens includes, in order from an object side: a first lens that has a negative refractive power and is convex toward the object side; a second lens that has a positive refractive power and is a meniscus lens convex toward the object side; a stop; a third lens that has a positive refractive power and is convex toward an image side; and a cemented lens that has a positive refractive power as a whole and is formed by cementing a fourth lens and a fifth lens. Assuming that an Abbe number of the second lens with respect to d-line is $\nu_2$, a distance on an optical axis from a vertex of a surface of the first lens facing toward the object side to an image plane of the imaging lens is L, a focal length of the imaging lens (i.e. the whole system) is f, and a back focus of the imaging lens (i.e. the whole system) is Bf, the imaging lens satisfies the following conditional expressions (1) to (3).

$$\nu_2 > 30 \tag{1}$$

$$2.5 < L/f < 4.0 \tag{2}$$

$$0.5 < Bf/f < 1.3 \tag{3}$$

In addition, with respect to back focuses of the Bf and the L mentioned above, an air-converted distance is used.

In the imaging lens according to the aspect of the invention simply configured to have at least five lenses, the conditional expressions (1) to (3) are satisfied by appropriately adjusting refractive power arrangement, configuration of the lens elements, and a position of the stop. Thus, it is possible to obtain performance advantageous in a small F number and downsizing. Particularly, in the lens system, it is also possible to satisfactorily correct spherical aberration by forming the second lens as a positive meniscus lens convex toward the object side. Therefore, it becomes easy to embody a high speed optical system having a small F number. In addition, by satisfying the conditional expression (1), it is possible to satisfactorily correct longitudinal chromatic aberration, and by satisfying the conditional expressions (2) and (3), it is possible to achieve downsizing.

In this case, in the imaging lens according to the aspect of the invention, assuming that a focal length of the third lens is $f_3$ and the focal length of the imaging lens (i.e. the whole system) is f, it is preferred that the following conditional expression (4) be satisfied.

$$1 < f_3/f < 4 \tag{4}$$

In addition, in the imaging lens according to the aspect of the invention, assuming that an on-axis airspace between the first lens and the second lens is $D_2$ and the focal length of the imaging lens (i.e. the whole system) is f, it is preferred that the following conditional expression (5) be satisfied.

$$0.01 < D_2/f < 0.7 \tag{5}$$

In addition, in the imaging lens according to the aspect of the invention, assuming that a distance on the optical axis from a vertex of a surface of the first lens facing toward the image side to the stop is d and a focal length of the first lens is $f_1$, it is preferred that the following conditional expression (6) be satisfied.

$$-1.5 < d/f_1 < -0.1 \tag{6}$$

In addition, in the imaging lens according to the aspect of the invention, assuming that an Abbe number of the fourth lens with respect to d-line is $\nu_4$ and an Abbe number of the fifth lens with respect to d-line is $\nu_5$, it is preferred that the following conditional expression (7) be satisfied.

$$\nu_4/\nu_5 > 1.5 \tag{7}$$

In addition, in the imaging lens according to the aspect of the invention, it is preferred that a thickness of the center of the first lens be 1 mm or more.

In addition, in the values of the conditional expressions (1) to (7), d-line (wavelength 587.6 nm) is set as a reference wavelength. If there is no specific description about that in the invention, the d-line is assumed as the reference wavelength.

According to another aspect of the invention, an image pickup apparatus includes: the imaging lens described above; and an image pickup device that converts an optical image formed by the imaging lens into an electric signal.

BRIEF DESCRIPTION OF THE DRAWINGS

FIG. 5 is a sectional diagram showing a configuration of an imaging lens according to Example 4 of the invention;

FIG. 6 is a sectional diagram showing a configuration of an imaging lens according to Example 5 of the invention;

DETAILED DESCRIPTION OF THE INVENTION

Hereinafter, embodiments of the invention will be described in detail with reference to the drawings. First, referring to FIG. 1, an imaging lens according to an embodiment of the invention will be described, and then an image pickup apparatus according to an embodiment of the invention will be described.

Figure 1:
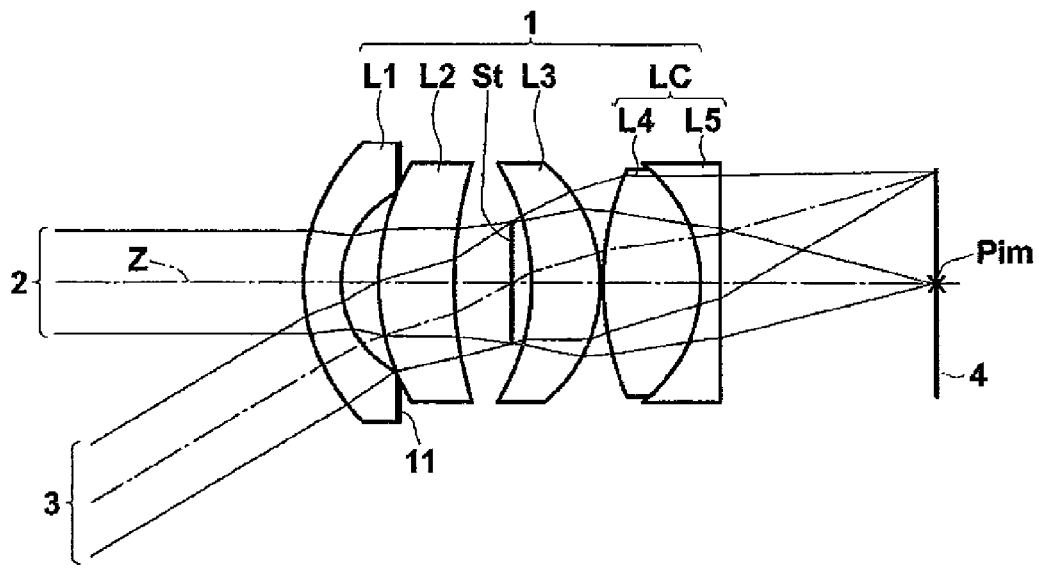
FIG. 1 is an optical path diagram showing an imaging lens according to an embodiment of the invention.

FIG. 1 is a lens sectional diagram illustrating an imaging lens 1 according to the embodiment of the invention. In addition, an exemplary configuration shown in FIG. 1 corresponds to a lens configuration according to Example 1 to be described later. In FIG. 1, there are also shown on-axis rays 2 and off-axis rays 3 which are incident at a maximum angle of view.

The imaging lens 1 includes, in order from an object side along an optical axis Z: a first lens L1 that has a negative refractive power and is convex toward the object side; a second lens L2 that has a positive refractive power and is formed as a meniscus lens convex toward the object side; an aperture diaphragm St (as a stop); a third lens L3 that has a positive refractive power and is convex toward an image side; and a cemented lens LC that has a positive refractive power as a whole and is formed by cementing a fourth lens L4 and a fifth lens L5. In addition, the aperture diaphragm St shown in FIG. 1 does not illustrate a shape and a size thereof, but illustrates a position thereof on the optical axis Z.

In addition, in FIG. 1, there is also illustrated an image pickup device 4 disposed on an image plane including an imaging position Pim of the imaging lens 1, in consideration of the case where the imaging lens 1 is applied to an image pickup apparatus. The image pickup device 4 is for converting an optical image formed by the imaging lens 1 into an electric signal, and includes, for example, CCD image sensor and the like.

In addition, when the imaging lens 1 is applied to an image pickup apparatus, a protective cover glass may be disposed between a lens system and an image pickup device. Alternatively, a low pass filter, an infrared cut filter, or the like may be disposed therebetween in accordance with a configuration of a camera side on which the lens is mounted. For example, when the imaging lens is used in an on-board camera as a night vision camera for eyesight at nighttime, for example, a filter for cutting blue light from ultraviolet light may be inserted between the lens system and the image pickup device. Alternatively, a predetermined coating is performed on the cover glass, and thus the cover glass multiply functions as an infrared cut filter, an ultraviolet cut filter, and the like.

As shown in FIG. 1, in the imaging lens 1, the first lens L1 is formed as a negative lens convex toward the object side, and thus it is possible to capture rays having large incident angles with respect to the convex surface of the first lens L1 facing toward the object side. As a result, it is possible to increase an angle of view in the optical system. In addition, as exemplarily shown in FIG. 1, by forming the first lens L1 as a negative meniscus lens, it is possible to decrease Petzval sum, and thus it is possible to correct curvature of an image plane throughout the whole imaging region.

By forming an object side surface of the second lens L2 as a convex surface, the surface is operable to make divergent rays exiting from the negative first lens L1 be converged, and thus it is possible to shorten a total length of the imaging lens in the optical axis direction. In addition, by forming the second lens L2 as a positive meniscus lens convex toward the object side, it is possible to suppress occurrence of various aberrations, and particularly it is possible to satisfactorily correct spherical aberration. Thus, it becomes easy to embody a high speed optical system having a small F number.

In addition, the third lens L3 is formed as a positive lens convex toward the image side and, as exemplarily shown in FIG. 1, the third lens L3 is formed as a meniscus lens, and the third lens L3 and the second lens L2 formed as a meniscus lens is disposed to face each other with the aperture diaphragm St interleaved therebetween. Thus, it is possible to satisfactorily correct various aberrations.

As exemplarily shown in FIG. 1, it is preferred that the cemented lens LC include a positive lens and a negative lens. In this case, it is possible to satisfactorily correct chromatic aberration.

Here, assuming that an Abbe number of the second lens L2 with respect to d-line is $v_2$, a distance on the optical axis from a vertex of the surface of the first lens L1 facing toward the object side to the image plane thereof is L, a focal length of the imaging lens is f, and a back focus of the imaging lens is Bf, the imaging lens 1 according to the embodiment is configured to satisfy the following conditional expressions (1) to (3).

$$\nu_2 > 30 \tag{1}$$

$$2.5 < L/f < 4.0 \tag{2}$$

$$0.5 < Bf/f < 1.3 \tag{3}$$

The conditional expression (1) defines the Abbe number of the second lens L2 in the vicinity of the aperture diaphragm St. When the lower limit of the conditional expression (1) is not exceeded, it is difficult to correct longitudinal chromatic aberration.

When the upper limit of the conditional expression (2) is exceeded, it becomes hard to achieve downsizing since the length of the imaging lens increases. When the lower limit of the conditional expression (2) is not exceeded, thicknesses of the lenses decrease since the length of the imaging lens becomes too short, and thus, processability thereof deteriorates and so cost thereof increases. Alternatively, an angle of view thereof becomes too small since the focal length of the imaging lens is too long.

When the upper limit of the conditional expression (3) is exceeded, a back focus becomes too long and thus a size of the optical system increases, or the thicknesses of the lenses decrease. Therefore, processability thereof deteriorates and so cost thereof increases. When the lower limit of the conditional expression (3) is not exceeded, an angle of the off-axis ray incident on the image plane increases, and so shading increases when the imaging lens is applied to an image pickup apparatus.

In addition, in the imaging lens according to the embodiment of the invention, assuming that a focal length of the third lens L3 is $f_3$ and the focal length of the imaging lens is f, it is preferred that the following conditional expression (4) be satisfied.

$$1 < f_3/f < 4 \tag{4}$$

When the upper limit of the conditional expression (4) is exceeded, it is difficult to correct comatic aberration. When the lower limit of the conditional expression (4) is not exceeded, it is difficult to correct spherical aberration.

In addition, in the imaging lens according to the embodiment of the invention, assuming that an on-axis airspace between the first lens L1 and the second lens L2 is $D_2$ and the focal length of the imaging lens is f, it is preferred that the following conditional expression (5) be satisfied.

$$0.01 < D_2/f < 0.7 \tag{5}$$

When the upper limit of the conditional expression (5) is exceeded, it is difficult to correct the curvature of the image plane and a diameter of the first lens L1 increases. Thus, it is also difficult to achieve downsizing. When the lower limit of the conditional expression (5) is not exceeded, the first lens L1 becomes too close to the second lens L2. Thus, vignetting of outer peripheral rays among the off-axis rays increases, and so a center-to-corner ratio remarkably deteriorates.

In addition, in the imaging lens according to the embodiment of the invention, assuming that a distance on the optical axis from a vertex of a surface of the first lens L1 facing toward the image side to the aperture diaphragm St is d and a focal length of the first lens L1 is $f_1$, it is preferred that the following conditional expression (6) be satisfied.

$$-1.5 < d/f_1 < -0.1 \tag{6}$$

When the upper limit of the conditional expression (6) is exceeded, the length of the optical system in the optical axis direction increases or the refractive power of the first lens L1 decreases. Thus, the diameter of the lens increases. When the lower limit of the conditional expression (6) is not exceeded, it is difficult to correct spherical aberration.

In addition, in the imaging lens according to the embodiment of the invention, assuming that an Abbe number of the fourth lens L4 with respect to d-line is $\nu_4$ and an Abbe number of the fifth lens L5 with respect to d-line is $\nu_5$, it is preferred that the following conditional expression (7) be satisfied.

$$\nu_4/\nu_5 > 1.5 \tag{7}$$

When the lower limit of the conditional expression (7) is not exceeded, it is difficult to correct chromatic aberration, particularly, lateral chromatic aberration.

In addition, in the imaging lens according to the embodiment of the invention, it is preferred that a thickness of the center of the first lens L1 be 1 mm or more.

For example, when the imaging lens is applied to an on-board camera or a surveillance camera, the lens is required to have sufficient stiffness. Accordingly, by setting the center thickness of the first lens L1 as 1 mm or more, it is possible to keep lens stiffness.

In addition, in the imaging lens according to the embodiment of the invention, assuming that the focal length of the first lens L1 is $f_1$ and the focal length of the imaging lens is f, it is preferred that the following conditional expression (8) be satisfied.

$$-3.2 < f_1/f < -0.8 \tag{8}$$

When the upper limit of the conditional expression (8) is exceeded, a refractive power of the first lens L1 becomes too strong, and so sensitivity with respect to eccentricity increases. Thus, it is difficult to perform assembly. When the lower limit of the conditional expression (8) is not exceeded, it is difficult to achieve an increase in angle of view.

In addition, in the imaging lens according to the embodiment of the invention, assuming that the focal length of the second lens L2 is $f_2$ and the focal length of the imaging lens is f, it is preferred that the following conditional expression (9) be satisfied.

$$1.0 < f_2/f < 6.0 \tag{9}$$

When the upper limit of the conditional expression (9) is exceeded, comatic aberration increases in the periphery of the lens. Thus, it is difficult to obtain a good image. When the lower limit of the conditional expression (9) is not exceeded, curvature of the object side surface of the second lens L2 becomes too large. Thus, it is difficult to perform processing of the lens.

In addition, in the imaging lens according to the embodiment of the invention, assuming that a composite focal length of the cemented lens LC formed by cementing the fourth lens L4 and the fifth lens L5 is $f_{4+5}$ and the focal length of the imaging lens is f, it is preferred that the following conditional expression (10) be satisfied.

$$1.2 < f_{4+5}/f < 3.0 \tag{10}$$

When the upper limit of the conditional expression (10) is exceeded, a refractive power of the cemented lens LC decreases. Thus, it is difficult to satisfactorily correct chromatic aberration. When the lower limit of the conditional expression (10) is not exceeded, curvature of the cemented surface becomes too large. Thus, it is difficult to perform processing of the lens.

In addition, when the imaging lens is used in severe environment such as on-board camera, it is preferred that a lens disposed closest to the object side have high resistivity with respect to temperature variance caused by direct rays and surface deterioration caused by rainstorm. In addition, it is preferred that the lens use a material having high resistivity with respect to chemicals such as oils and cleansers, that is, a material having high water resistance, high antiweatherability, high acid resistance, and high chemical resistance. Hence, it is preferred that all lenses be made of glass.

In addition, as a material of the lens disposed closest to the object side, it is preferred to use a material that is hard and is scarcely broken, and specifically, it is preferred to use glass or transparent ceramics. The ceramics has properties of higher stiffness than normal glass and high heat resistance.

In addition, when the imaging lens is applied to an on-board camera, it is required to be available in a wide temperature range from outside air in a cold region to a vehicle inside in summer of a tropical region. When the imaging lens is used in the wide temperature range, it is preferred to use lens material having a small linear expansion coefficient.

In addition, in order to manufacture a low-cost lens, it is preferred that all lenses be formed as spherical lenses. Alternatively, in order to satisfactorily correct aberrations, an aspheric lens may be used. In addition, in order to form aspheric surface with high accuracy and low cost, the lens may be made of plastic.

In addition, there is a concern that rays passing through out of the effective diameter reach the image plane as stray light and become a ghost image, and thus it is preferred to shield the stray light by providing light shielding means. Examples of the shielding means may include an opaque coating material and an opaque plate member provided on a portion outside the effective diameter of a lens. Alternatively, the stray light may be shielded by providing an opaque plate member on the optical path of the stray light, as the shielding means. In FIG. 1, there is shown an example in which shielding means 11 is provided on the surface of the first lens L1 facing toward the image side.

EXAMPLES

Hereinafter, numerical examples of the imaging lens according to the invention will be described in detail.

Example 1

Table 1 shows lens data and various data of the imaging lens according to Example 1. In addition, in Table 1, various data is additionally shown in the lower part of the lens data. In the lens data of Table 1, a surface number represents the sequential number of i-th (i=1, 2, 3 . . . ) surface that sequentially increases as it gets closer to the image side when a surface of a component closest to the object side is defined as a first surface. In addition, in the lens data of Table 1, the aperture diaphragm St is also noted.

In Table 1, Ri represents a radius of curvature of i-th (i=1, 2, 3 . . . ) surface, and Di represents an on-axis surface spacing on the optical axis Z between the i-th (i=1, 2, 3 . . . ) surface and the (i+1)th surface on the optical. In addition, Ndj represents a refractive index with respect to d-line in a j-th (j=1, 2, 3 . . . ) optical element of which the sequential number sequentially increases as it gets closer to the image side when a surface of the optical element closest to the object side is defined as a first surface. In addition, vdj represents an Abbe number of the j-th optical element with respect to d-line. In Table 1, units of the radius of curvature and the on-axis surface spacing are mm. In addition, a direction in which the radius of curvature is convex toward the object side is defined as a positive direction, and a direction in which the radius of curvature is convex toward the image side is defined as a negative direction.

In the various data, FNo. represents a F number, ω represents a half angle of view, L represents a distance from a vertex of the object side surface of the first lens L1 to the image plane on the optical axis Z, f represents a focal length of the imaging lens, and Bf represents a back focus. In the various data, a unit of ω is degree, and all units other than the units of FNo. and ω are mm. In addition, the reference signs in Table 1 have the same meaning as the reference signs in examples to be described later.

TABLE 1

| | <Example 1> | | | |
|---|---|---|---|---|
| Surface Number | Ri | Di | Ndj | vdj |
| 1 | 7.89 | 1.50 | 1.7725 | 49.6 |
| 2 | 4.06 | 1.52 | | |
| 3 | 9.40 | 3.05 | 1.7550 | 52.3 |
| 4 | 16.65 | 2.35 | | |
| 5(AD) | ∞ | 0.80 | | |
| 6 | −9.03 | 2.83 | 1.8348 | 42.7 |
| 7 | −6.23 | 0.10 | | |
| 8 | 11.38 | 3.91 | 1.7725 | 49.6 |
| 9 | −6.23 | 0.80 | 1.8467 | 23.8 |
| 10 | ∞ | 8.72 | | |
| 11(Image Plane) | ∞ | | | |

AD: Aperture Diaphragm
Fno. = 2.00, ω = 29.6, L = 25.6, f = 8.5, Bf = 8.72

Figure 2:
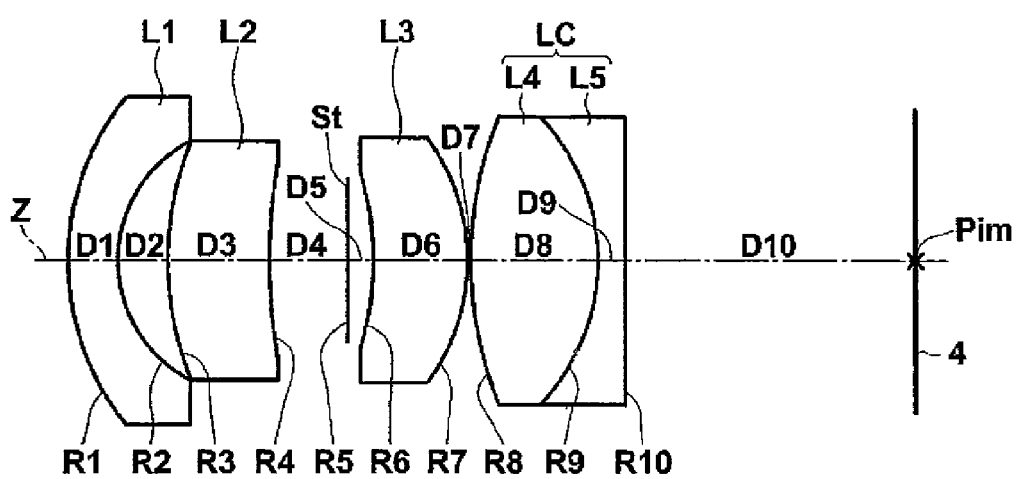
FIG. 2 is a sectional diagram showing a configuration of an imaging lens according to Example 1 of the invention.

FIG. 2 is a lens configuration diagram illustrating the lens according to Example 1. In FIG. 2, the reference signs Ri (i=1, 2, 3 . . . ) and Di (i=1, 2, 3 . . . ) correspond to the Ri and the Di in Table 1. In addition, in the reference signs in FIG. 2, the aperture diaphragm St is also noted. In addition, the aperture diaphragm St shown in FIG. 2 does not illustrate a shape and a size thereof, but illustrates a position thereof on the optical axis Z.

Example 2

Figure 3:
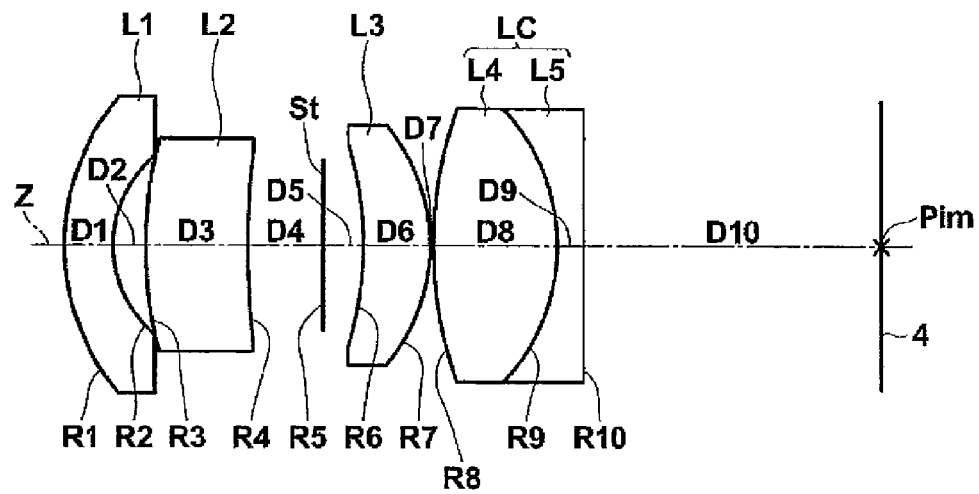
FIG. 3 is a sectional diagram showing a configuration of an imaging lens according to Example 2 of the invention.

Table 2 shows lens data and various data of the imaging lens according to Example 2. FIG. 3 shows a lens configuration diagram. In FIG. 3, the reference signs Ri and Di correspond to the Ri and the Di in Table 2.

TABLE 2

| | <Example 2> | | | |
|---|---|---|---|---|
| Surface Number | Ri | Di | Ndj | vdj |
| 1 | 7.36 | 1.50 | 1.7725 | 49.6 |
| 2 | 3.71 | 1.02 | | |
| 3 | 13.57 | 3.26 | 1.7550 | 52.3 |
| 4 | 25.36 | 2.39 | | |
| 5(AD) | ∞ | 1.28 | | |
| 6 | −10.83 | 2.10 | 1.8348 | 42.7 |
| 7 | −5.92 | 0.10 | | |
| 8 | 13.15 | 3.91 | 1.7725 | 49.6 |
| 9 | −6.30 | 0.81 | 1.8467 | 23.8 |
| 10 | ∞ | 9.40 | | |
| 11(Image Plane) | ∞ | | | |

AD: Aperture Diaphragm
Fno. = 2.00, ω = 29.3, L = 25.8, f = 8.5, Bf = 9.40

Example 3

Figure 4:
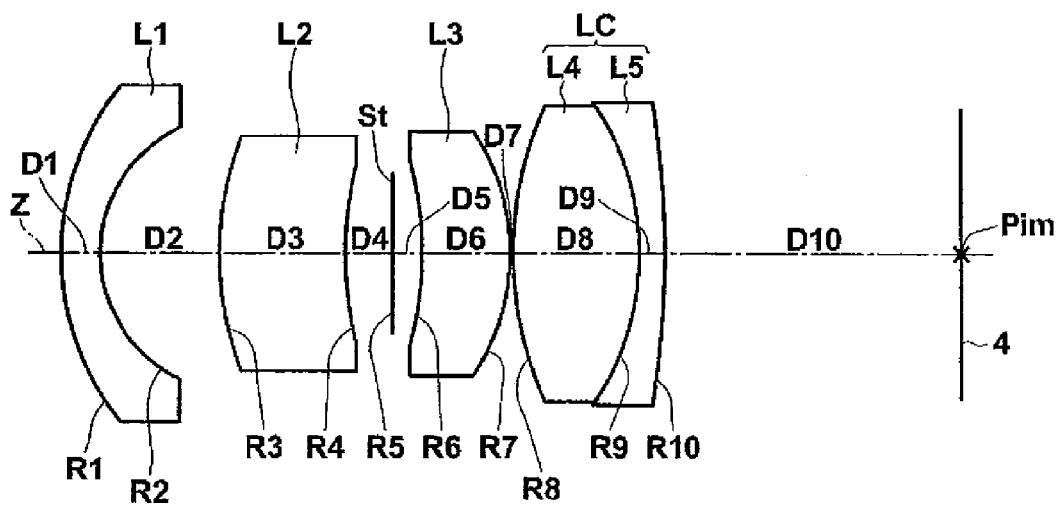
FIG. 4 is a sectional diagram showing a configuration of an imaging lens according to Example 3 of the invention.

Table 3 shows lens data and various data of the imaging lens according to Example 3. FIG. 4 shows a lens configuration diagram. In FIG. 4, the reference signs Ri and Di correspond to the Ri and the Di in Table 3.

TABLE 3

| | <Example 3> | | | |
|---|---|---|---|---|
| Surface Number | Ri | Di | Ndj | vdj |
| 1 | 8.59 | 1.20 | 1.7725 | 49.6 |
| 2 | 4.42 | 3.73 | | |
| 3 | 9.96 | 3.98 | 1.8348 | 42.7 |
| 4 | 11.31 | 1.50 | | |
| 5(AD) | ∞ | 0.94 | | |
| 6 | −11.23 | 2.72 | 1.8348 | 42.7 |
| 7 | −7.10 | 0.10 | | |
| 8 | 11.24 | 4.01 | 1.7130 | 53.9 |
| 9 | −8.39 | 0.80 | 1.9229 | 18.9 |
| 10 | −29.33 | 9.32 | | |
| 11(Image Plane) | ∞ | | | |

AD: Aperture Diaphragm
Fno. = 2.00, ω = 32.6, L = 28.3, f = 7.8, Bf = 9.32

Example 4

Table 4 shows lens data and various data of the imaging lens according to Example 4. FIG. 5 shows a lens configuration diagram. In FIG. 5, the reference signs Ri and Di correspond to the Ri and the Di in Table 4.

TABLE 4

| | <Example 4> | | | |
|---|---|---|---|---|
| Surface Number | Ri | Di | Ndj | vdj |
| 1 | 5.79 | 1.21 | 1.5168 | 64.2 |
| 2 | 3.83 | 1.90 | | |
| 3 | 10.82 | 0.82 | 1.7550 | 52.3 |
| 4 | 16.66 | 2.39 | | |
| 5(AD) | ∞ | 0.72 | | |
| 6 | −5.99 | 3.50 | 1.8340 | 37.2 |
| 7 | −6.15 | 1.00 | | |
| 8 | 11.51 | 3.91 | 1.7725 | 49.6 |
| 9 | −5.60 | 1.50 | 1.8467 | 23.8 |
| 10 | −44.10 | 8.28 | | |
| 11(Image Plane) | ∞ | | | |

AD: Aperture Diaphragm
Fno. = 2.00, ω = 29.8, L = 25.2, f = 8.6, Bf = 8.28

Example 5

Table 5 shows lens data and various data of the imaging lens according to Example 5. FIG. 6 shows a lens configuration diagram. In FIG. 6, the reference signs Ri and Di correspond to the Ri and the Di in Table 5.

TABLE 5

| | <Example 5> | | | |
|---|---|---|---|---|
| Surface Number | Ri | Di | Ndj | vdj |
| 1 | 15.29 | 1.50 | 1.7725 | 49.6 |
| 2 | 4.54 | 0.84 | | |
| 3 | 9.40 | 6.90 | 1.7550 | 52.3 |
| 4 | 29.65 | 1.50 | | |
| 5(AD) | ∞ | 0.80 | | |
| 6 | −10.66 | 2.00 | 1.8348 | 42.7 |
| 7 | −6.19 | 0.10 | | |
| 8 | 11.09 | 3.91 | 1.7725 | 49.6 |
| 9 | −6.52 | 0.80 | 1.8467 | 23.8 |
| 10 | 135.40 | 9.07 | | |
| 11(Image Plane) | ∞ | | | |

AD: Aperture Diaphragm
Fno. = 2.00, ω = 30.3, L = 27.4, f = 8.3, Bf = 9.07

Example 6

Figure 7:
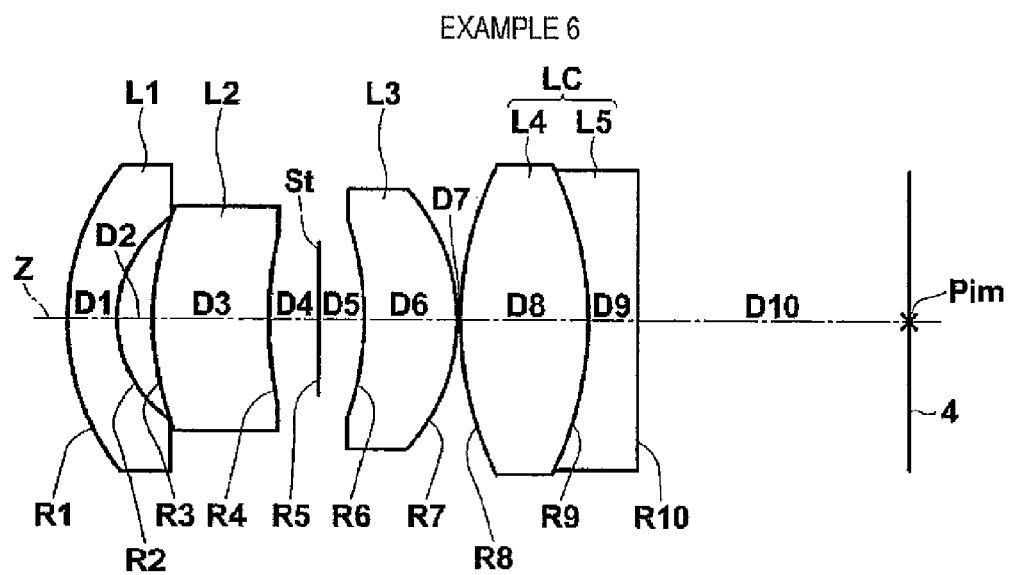
FIG. 7 is a sectional diagram showing a configuration of an imaging lens according to Example 6 of the invention.

Table 6 shows lens data and various data of the imaging lens according to Example 6. FIG. 7 shows a lens configuration diagram. In FIG. 7, the reference signs Ri and Di correspond to the Ri and the Di in Table 6.

TABLE 6

| | <Example 6> | | | |
|---|---|---|---|---|
| Surface Number | Ri | Di | Ndj | vdj |
| 1 | 7.67 | 1.50 | 1.7725 | 49.6 |
| 2 | 3.89 | 1.05 | | |
| 3 | 9.19 | 3.54 | 1.7550 | 52.3 |
| 4 | 14.07 | 1.55 | | |
| 5(AD) | ∞ | 1.43 | | |
| 6 | −9.29 | 2.89 | 1.8348 | 42.7 |
| 7 | −5.91 | 0.10 | | |
| 8 | 10.87 | 3.91 | 1.8348 | 42.7 |
| 9 | −10.81 | 1.50 | 2.1435 | 17.8 |
| 10 | ∞ | 8.41 | | |
| 11(Image Plane) | ∞ | | | |

AD: Aperture Diaphragm
Fno. = 2.00, ω = 29.8, L = 25.9, f = 8.5, Bf = 8.41

Example 7

Figure 8:
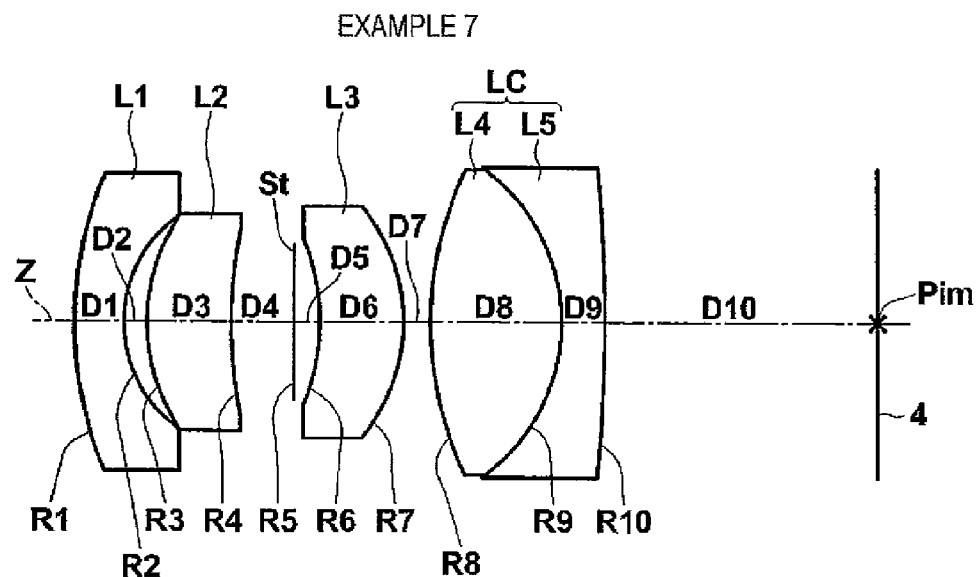
FIG. 8 is a sectional diagram showing a configuration of an imaging lens according to Example 7 of the invention.

Table 7 shows lens data and various data of the imaging lens according to Example 7. FIG. 8 shows a lens configuration diagram. In FIG. 8, the reference signs Ri and Di correspond to the Ri and the Di in Table 7.

TABLE 7

| | <Example 7> | | | |
|---|---|---|---|---|
| Surface Number | Ri | Di | Ndj | vdj |
| 1 | 11.80 | 1.50 | 1.8348 | 42.7 |
| 2 | 4.04 | 0.73 | | |
| 3 | 6.07 | 2.58 | 1.8348 | 42.7 |
| 4 | 14.94 | 1.94 | | |
| 5(AD) | ∞ | 0.80 | | |
| 6 | −6.73 | 2.57 | 1.8348 | 42.7 |
| 7 | −5.61 | 0.83 | | |
| 8 | 10.94 | 4.01 | 1.7550 | 52.3 |
| 9 | −5.87 | 1.30 | 1.8467 | 23.8 |
| 10 | −51.53 | 8.43 | | |
| 11(Image Plane) | ∞ | | | |

AD: Aperture Diaphragm
Fno. = 2.00, ω = 30.2, L = 24.7, f = 8.5, Bf = 8.43

Example 8

Figure 9:
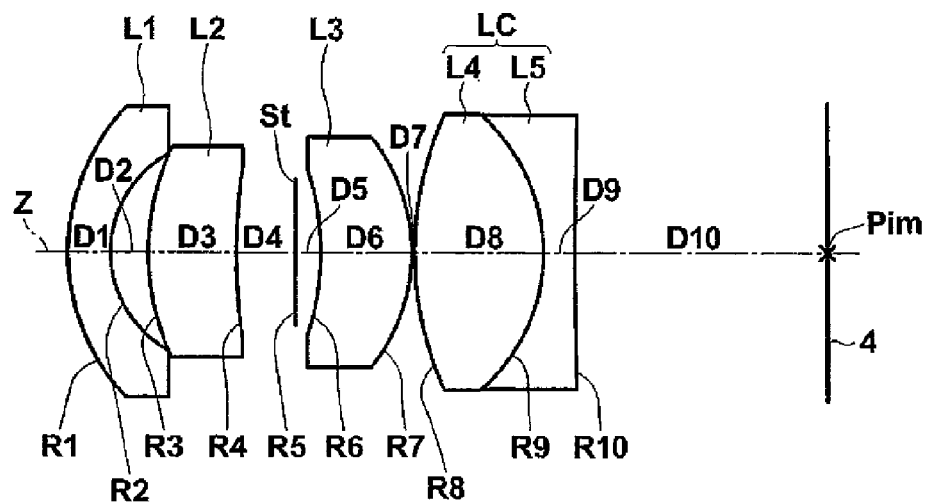
FIG. 9 is a sectional diagram showing a configuration of an imaging lens according to Example 8 of the invention.
Figure 10:
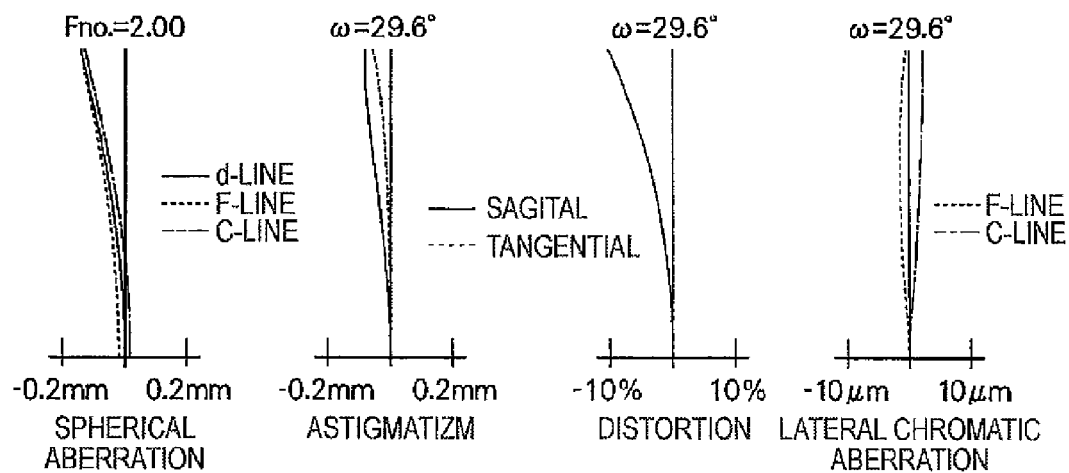
FIG. 10 is a diagram showing various aberrations of the imaging lens according to Example 1 of the invention.
Figure 11:
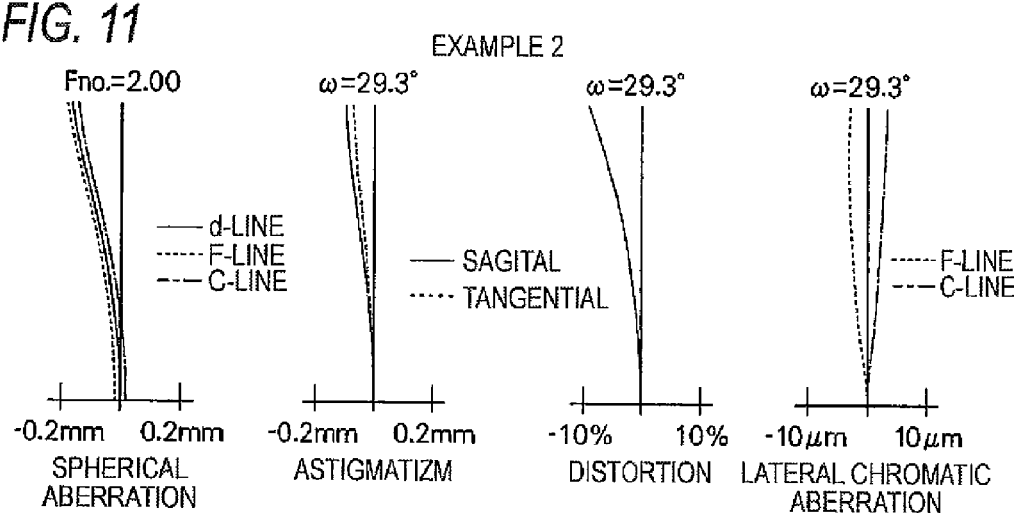
FIG. 11 is a diagram showing various aberrations of the imaging lens according to Example 2 of the invention.
Figure 12:
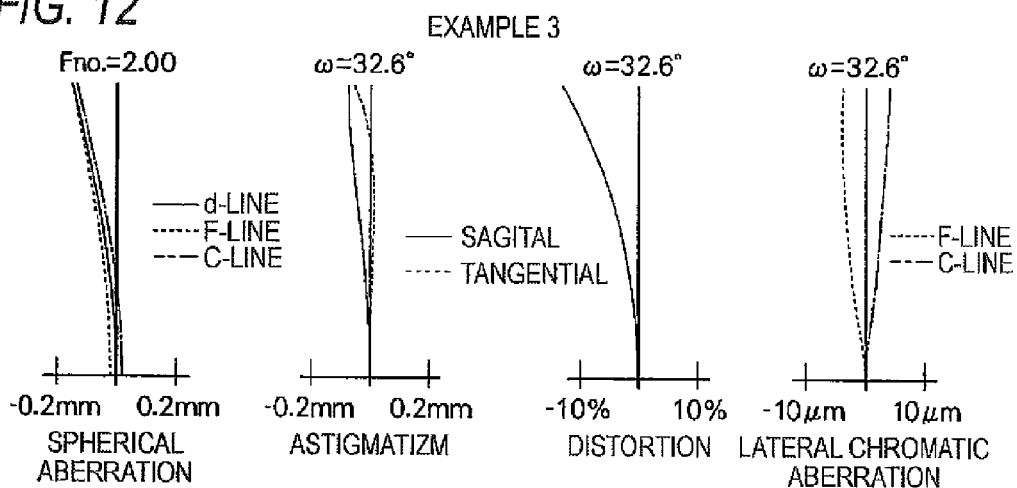
FIG. 12 is a diagram showing various aberrations of the imaging lens according to Example 3 of the invention.
Figure 13:
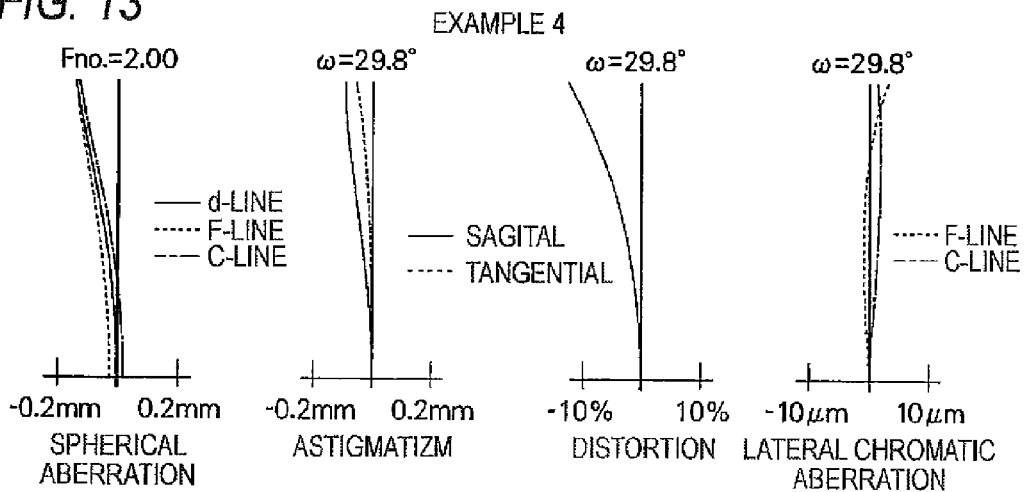
FIG. 13 is a diagram showing various aberrations of the imaging lens according to Example 4 of the invention.
Figure 14:
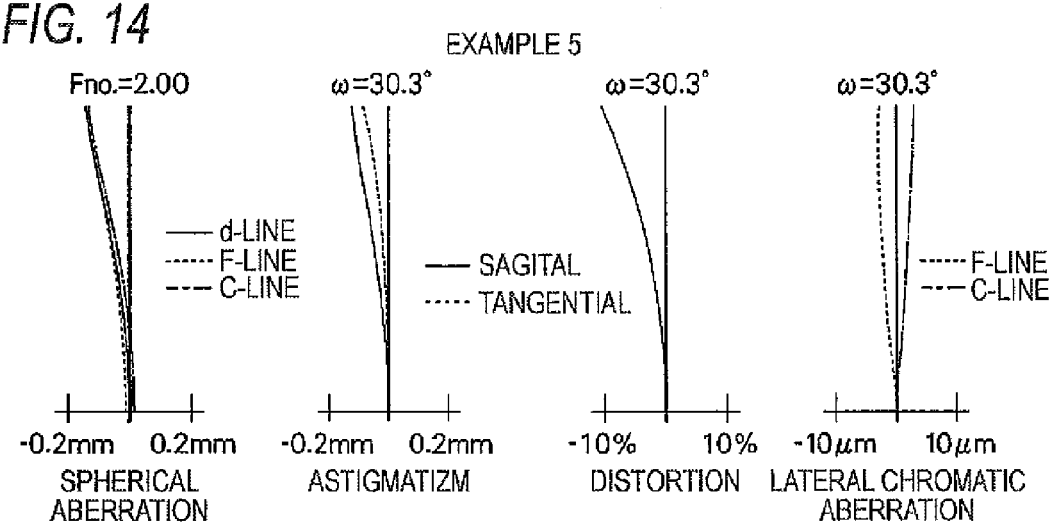
FIG. 14 is a diagram showing various aberrations of the imaging lens according to Example 5 of the invention.
Figure 15:
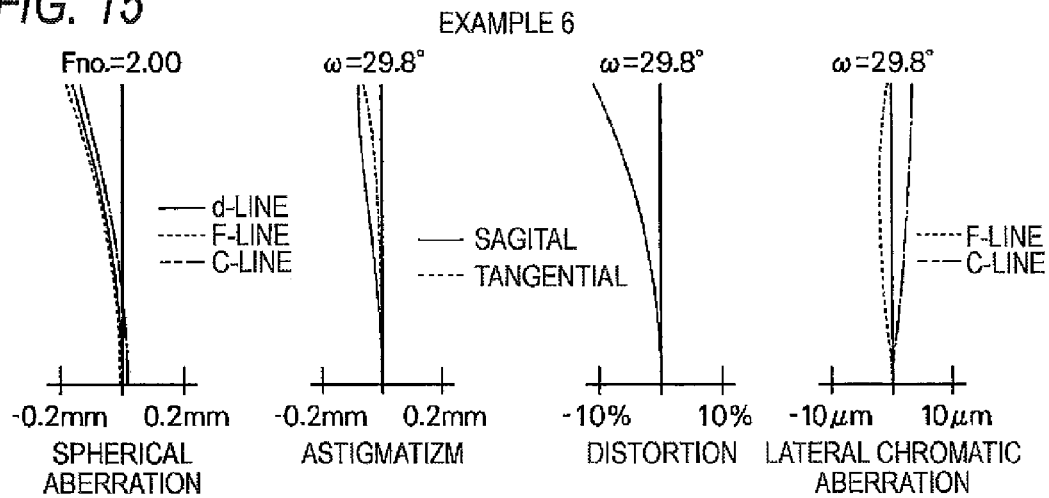
FIG. 15 is a diagram showing various aberrations of the imaging lens according to Example 6 of the invention.
Figure 16:
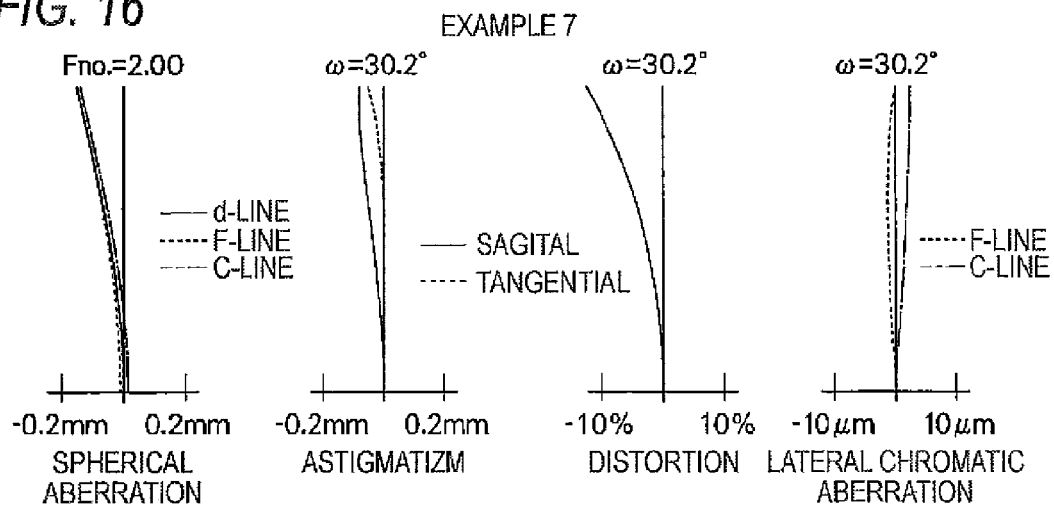
FIG. 16 is a diagram showing various aberrations of the imaging lens according to Example 7 of the invention.
Figure 17:
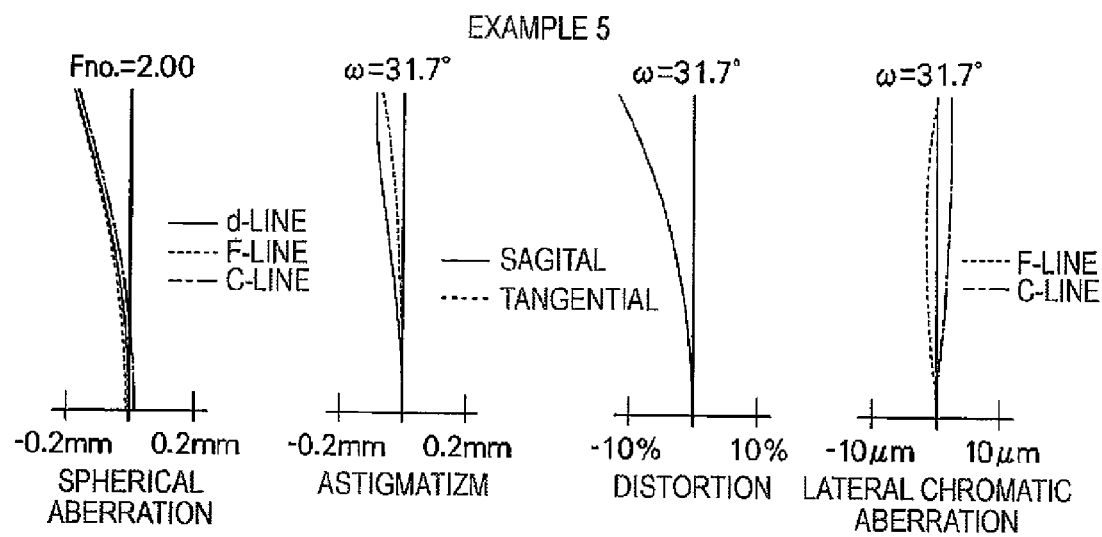
FIG. 17 is a diagram showing various aberrations of the imaging lens according to Example 8 of the invention.

Table 8 shows lens data and various data of the imaging lens according to Example 8. FIG. 9 shows a lens configuration diagram. In FIG. 9, the reference signs Ri and Di correspond to the Ri and the Di in Table 8.

TABLE 8

<Example 8>

| Surface Number | Ri | Di | Ndj | vdj |
|---|---|---|---|---|
| 1 | 6.56 | 1.33 | 1.7725 | 49.6 |
| 2 | 3.55 | 1.17 | | |
| 3 | 7.93 | 2.72 | 1.5168 | 64.2 |
| 4 | 19.01 | 1.81 | | |
| 5(AD) | ∞ | 0.80 | | |
| 6 | −8.06 | 2.87 | 1.8348 | 42.7 |
| 7 | −5.69 | 0.10 | | |
| 8 | 10.64 | 4.01 | 1.7725 | 49.6 |
| 9 | −5.70 | 0.96 | 1.8467 | 23.8 |
| 10 | 183.00 | 7.91 | | |
| 11(Image Plane) | ∞ | | | |

AD: Aperture Diaphragm
Fno. = 2.00, ω = 31.7, L = 23.7, f = 7.9, Bf = 7.91

In the imaging lens according to Examples 1 to 8 mentioned above, Table 9 shows values corresponding to the conditional expressions (1) to (5), and Table 10 shows values corresponding to the conditional expressions (6) to (10). As known from Tables 9 and 10, the imaging lenses according to Examples 1 to 8 satisfy all of the conditional expressions (1) to (10).

TABLE 9

| | Conditional Expression | | | | |
|---|---|---|---|---|---|
| | (1) $\nu_2$ | (2) L/f | (3) Bf/f | (4) $f_3/f$ | (5) $D_2/f$ |
| Example 1 | 52.30 | 3.02 | 1.03 | 1.95 | 0.18 |
| Example 2 | 52.30 | 3.04 | 1.11 | 1.55 | 0.12 |
| Example 3 | 42.70 | 3.64 | 1.20 | 2.29 | 0.48 |
| Example 4 | 52.30 | 2.92 | 0.96 | 3.56 | 0.22 |
| Example 5 | 52.30 | 3.32 | 1.10 | 1.78 | 0.10 |
| Example 6 | 52.30 | 3.06 | 0.99 | 1.65 | 0.12 |
| Example 7 | 42.70 | 2.91 | 1.00 | 2.33 | 0.09 |
| Example 8 | 64.20 | 2.99 | 1.00 | 1.88 | 0.15 |

TABLE 10

| | Conditional Expression | | | | |
|---|---|---|---|---|---|
| | (6) $d/f_1$ | (7) $\nu_4/\nu_5$ | (8) $f_1/f$ | (9) $f_2/f$ | (10) $f_{4+5}/f$ |
| Example 1 | 0.53 | 2.08 | −1.54 | 2.86 | 2.05 |
| Example 2 | 0.57 | 2.08 | −1.39 | 4.08 | 2.44 |
| Example 3 | 0.68 | 2.85 | −1.73 | 5.48 | 1.88 |
| Example 4 | 0.18 | 2.08 | −3.22 | 4.46 | 1.62 |
| Example 5 | 1.04 | 2.08 | −1.08 | 1.92 | 2.20 |
| Example 6 | 0.50 | 2.40 | −1.46 | 3.16 | 2.23 |
| Example 7 | 0.65 | 2.20 | −0.95 | 1.28 | 1.71 |
| Example 8 | 0.46 | 2.08 | −1.57 | 3.07 | 2.18 |

FIGS. 10 to 17 are aberration diagrams showing spherical aberration, astigmatism, distortion and lateral chromatic aberration of the imaging lenses according to Examples 1 to 8. In the aberration diagrams, there are shown aberrations in which d-line is set as a reference wavelength. However, in the spherical aberration diagrams and the lateral chromatic aberration diagrams, there are also shown aberrations with respect to F-line (a wavelength 486.1 nm) and C-line (a wavelength 656.3 nm). In addition, the aberration diagram of distortion shows a deviation amount from an ideal image height expressed by f×tan θ, where f is the focal length of the imaging lens and θ (0≦θ≦ω) is the half angle of view. The FNo. in the spherical aberration diagram is a F number, the ω in the other aberration diagrams is a half angle of view. As known from FIGS. 10 to 17, in Examples 1 to 8, a small F number was secured, and the aberrations were satisfactorily corrected.

Since the imaging lenses according to Examples 1 to 8 mentioned above have a good optical performance and can be downsized, the imaging lenses are applicable to on-board cameras and the like in order to take images of the front, the side, and the rear of a vehicle. In addition, since the imaging lenses according to Examples 1 to 8 have a small F number, the imaging lenses are appropriate to take a video and use at nighttime.

Figure 18:
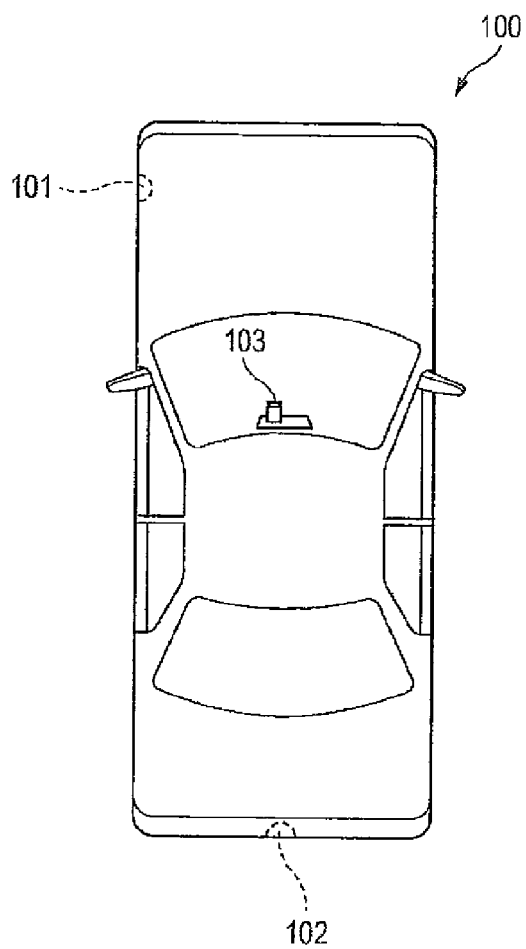
FIG. 18 is a diagram for explaining arrangement of an on-vehicle image pickup apparatus according to the embodiment of the invention.

As a use example, FIG. 18 shows a figure in which the imaging lens and the image pickup apparatus according to the embodiment are mounted on a vehicle 100. In FIG. 18, the vehicle 100 includes an outside-vehicle camera 101 for photographing a blind spot area of the passenger seat side, an outside-vehicle camera 102 for photographing a blind spot area of the rear of the vehicle 100, and an in-vehicle camera 103 disposed on the rear of a room mirror and for photographing the same visual field range as a driver. The outside-vehicle camera 101, the outside-vehicle camera 102, and the in-vehicle camera 103 are image pickup apparatuses, and include the imaging lens 1 according to the embodiment of the invention and the image pickup device 4 converting an optical image formed by the imaging lens 1 into an electric signal.

As mentioned above, the imaging lens 1 according to the embodiment of the invention has a small F number, a small size and good optical performance. Thus, it is possible to downsize the outside-vehicle cameras 101 and 102 and the in-vehicle camera 103, and it is also possible to form a good image in the wide range of an angle of view on the image plane of the image pickup device 4. In addition, the imaging lens 1 can be manufactured at low cost in that the lens has a small size and a small number of lens elements. Accordingly, the outside-vehicle cameras 101 and 102 and the in-vehicle camera 103 can be also manufactured at low cost.

The invention has been described with reference to the embodiment and the examples, but the invention is not limited to the embodiment mentioned above, and may be modified to various forms. For example, the values of a radius of curvature, an on-axis surface spacing, and a refractive index of the lens components are not limited to the values noted in the numerical examples, and can have the other values.

In addition, in the embodiment of the image pickup apparatus, the example in which the invention is applied to the on-board camera has been described with reference to the drawing, but the invention is not limited to this application, and is also applicable to, for example, a cell phone camera or a surveillance camera.

According to the invention, by appropriately setting the configurations of the lenses in the lens system including at least five lenses, the conditional expressions (1) to (3) are satisfied. Thus, it is possible to provide an imaging lens that has a small F number and a small size while maintaining a good optical performance, and an image pickup apparatus having the imaging lens.

The entire disclosure of each and every foreign patent application from which the benefit of foreign priority has been claimed in the present application is incorporated herein by reference, as if fully set forth.

What is claimed is:

1. An imaging lens comprising, in order from an object side:
   a first lens that has a negative refractive power and is convex toward the object side;
   a second lens that has a positive refractive power and is a meniscus lens convex toward the object side;

a stop;

a third lens that has a positive refractive power and is convex toward an image side; and a cemented lens that has a positive refractive power as a whole and is formed by cementing a fourth lens and a fifth lens, wherein assuming that an Abbe number of the second lens with respect to d-line is $v_2$, a distance on an optical axis from a vertex of a surface of the first lens facing toward the object side to an image plane of the imaging lens is L, a focal length of the imaging lens is f, and a back focus of the imaging lens is Bf, the following conditional expressions (1) to (3) are satisfied:

$$v_2 > 30 \tag{1},$$

$$2.5 < L/f < 4.0 \tag{2, and}$$

$$0.5 < Bf/f < 1.3 \tag{3}.$$

2. The imaging lens according to claim 1, wherein assuming that a focal length of the third lens is $f_3$ and the focal length of the imaging lens is f, the following conditional expression (4) is satisfied:

$$1 < f_3/f < 4 \tag{4}.$$

3. The imaging lens according to claim 1, wherein assuming that an on-axis airspace between the first lens and the second lens is $D_2$ and the focal length of the imaging lens is f, the following conditional expression (5) is satisfied:

$$0.01 < D_2/f < 0.7 \tag{5}.$$

4. The imaging lens according to claim 1, wherein assuming that a distance on the optical axis from a vertex of a surface of the first lens facing toward the image side to the stop is d and a focal length of the first lens is $f_1$, the following conditional expression (6) is satisfied:

$$-1.5 < d/f_1 < -0.1 \tag{6}.$$

5. The imaging lens according to claim 1, wherein assuming that an Abbe number of the fourth lens with respect to d-line is $v_4$ and an Abbe number of the fifth lens with respect to d-line is $v_5$, the following conditional expression (7) is satisfied:

$$v_4/v_5 > 1.5 \tag{7}.$$

6. The imaging lens according to claim 1, wherein a thickness of the center of the first lens is 1 mm or more.

7. An image pickup apparatus comprising:

the imaging lens according to claim 1; and an image pickup device that converts an optical image formed by the imaging lens into an electric signal.

8. The imaging lens according to claim 2, wherein assuming that an on-axis airspace between the first lens and the second lens is $D_2$ and the focal length of the imaging lens is f, the following conditional expression (5) is satisfied:

$$0.01 < D_2/f < 0.7 \tag{5}.$$

9. The imaging lens according to claim 3, wherein assuming that a distance on the optical axis from a vertex of a surface of the first lens facing toward the image side to the stop is d and a focal length of the first lens is $f_1$, the following conditional expression (6) is satisfied:

$$-1.5 < d/f_1 < -0.1 \tag{6}.$$

10. The imaging lens according to claim 4, wherein assuming that an Abbe number of the fourth lens with respect to d-line is $v_4$ and an Abbe number of the fifth lens with respect to d-line is $v_5$, the following conditional expression (7) is satisfied:

$$v_4/v_5 > 1.5 \tag{7}.$$

11. The imaging lens according to claim 5, wherein a thickness of the center of the first lens is 1 mm or more.

12. The imaging lens according to claim 8, wherein assuming that a distance on the optical axis from a vertex of a surface of the first lens facing toward the image side to the stop is d and a focal length of the first lens is $f_1$, the following conditional expression (6) is satisfied:

$$-1.5 < d/f_1 < -0.1 \tag{6}.$$

13. The imaging lens according to claim 9, wherein assuming that an Abbe number of the fourth lens with respect to d-line is $v_4$ and an Abbe number of the fifth lens with respect to d-line is $v_5$, the following conditional expression (7) is satisfied:

$$v_4/v_5 > 1.5 \tag{7}.$$

14. The imaging lens according to claim 10, wherein a thickness of the center of the first lens is 1 mm or more.

15. The imaging lens according to claim 12, wherein assuming that an Abbe number of the fourth lens with respect to d-line is $v_4$ and an Abbe number of the fifth lens with respect to d-line is $v_5$, the following conditional expression (7) is satisfied:

$$v_4/v_5 > 1.5 \tag{7}.$$

16. The imaging lens according to claim 13, wherein a thickness of the center of the first lens is 1 mm or more.

17. The imaging lens according to claim 15, wherein a thickness of the center of the first lens is 1 mm or more.

18. An image pickup apparatus comprising:

the imaging lens according to claim 17; and an image pickup device that converts an optical image formed by the imaging lens into an electric signal.

* * * * *